Patented May 27, 1930

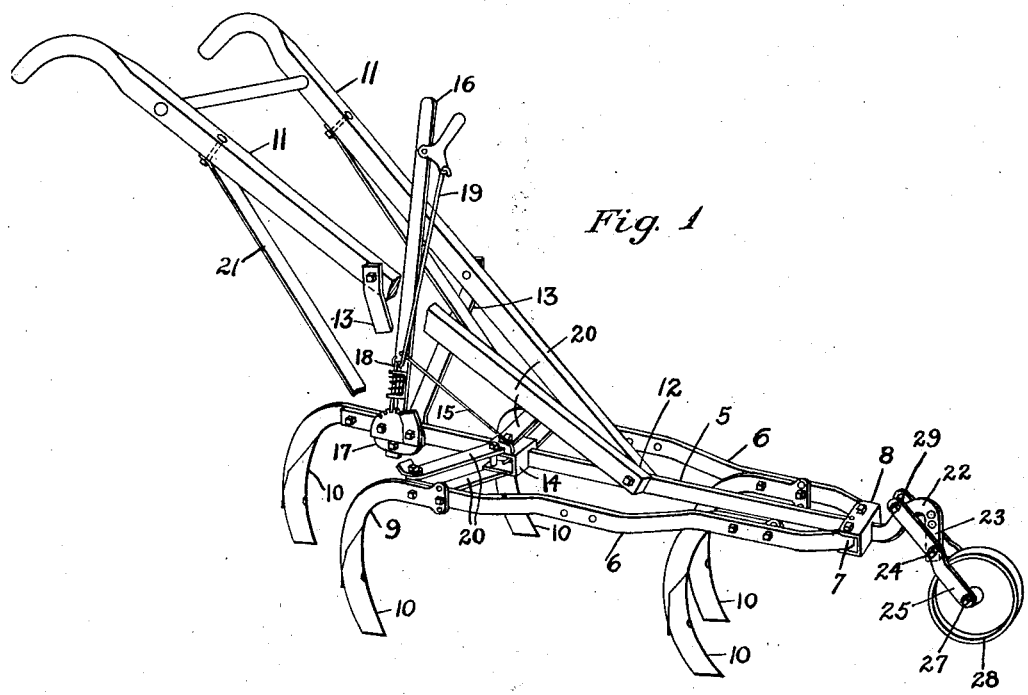
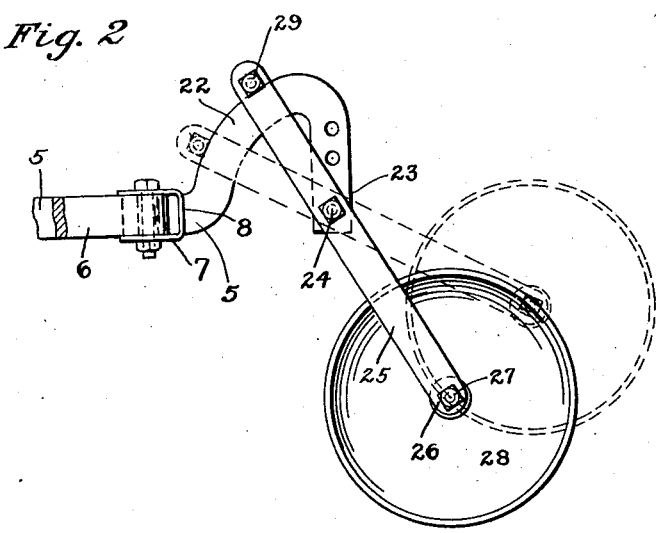
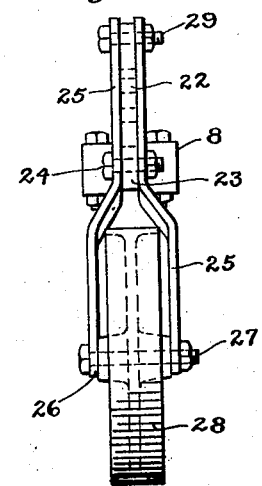

1,760,001

UNITED STATES PATENT OFFICE

ARTHUR W. REYNOLDS, OF LEONARDSVILLE, NEW YORK, ASSIGNOR TO THE BABCOCK MANUFACTURING COMPANY, OF LEONARDSVILLE, NEW YORK, A CORPORATION OF NEW YORK

CULTIVATOR

Application filed May 17, 1927. Serial No. 191,978.

This invention relates to farming implements such as cultivators, plows and the like and refers to that class of farming implement which carries upon the frame thereof an adjustable wheel for supporting a part of the implement and especially for regulating the depth the teeth of the implement are to run in the soil which it cultivates.

The object of the invention is to simplify and cheapen the cost of producing an adjustable wheel supporting means for cultivators, plows and implements of this class, and particularly to form a part of this adjusting means of or on the forward end portion of the cultivator or plow beam by providing an arcuate portion and a pivot with respect thereto, so that the wheel-carrying bracket may be pivotally supported and the bracket made adjustable by its engagement with the said arcuate portion as will be hereinafter more fully described.

In the accompanying drawing I have shown my invention applied to the forward end of the center beam of a walking cultivator, the same being a commercial type of horse-drawn cultivator extensively used.

The invention further relates to and consists in the construction and novel combination and arrangement of parts hereinafter more fully described, illustrated in the accompanying drawings and pointed out in the claim hereto appended. Various changes in the form, proportion, size and minor details of construction within the scope of the claim may be obviously resorted to without departing from the spirit of the invention.

Upon the accompanying drawings forming a part of this specification similar characters of reference will be found to denote like or corresponding parts throughout the several figures, and upon which, Fig. 1 shows a perspective view of a plain wheel walking cultivator embodying my improved adjusting mechanism for the wheel.

Fig. 2 shows an enlarged side elevational view of the wheel adjusting means as applied to a center cultivator beam, and Fig. 3 shows a front elevation of the wheel and parts shown in Fig. 2.

While I have shown my invention in the accompanying drawings as applied to a plain wheel type of walking cultivator, yet it will be obvious and within the scope of the claim to apply it to a single beam plow or other form of soil cultivator, and irrespective of whether it be formed of rolled steel or cast iron, or is made integral with the said beam or made separate and applied thereto.

In order that a clearer understanding of the invention and the cultivator to which it is applied may be had, I will first briefly describe the implement as shown in Fig. 1 of the drawing and wherein 5 represents the center beam and to the forward end of which a whiffle tree, not shown, may be attached for drawing the cultivator. 6—6 represent side beams which are hingedly attached as in 7 to a yoke member 8 secured to the forward end portion of the side beam 6. Each of the three beams 5 and 6 are provided with shanks 9 to which cultivator teeth 10 are secured, there being five of such shanks and teeth applied to the cultivator shown in the drawing though provision is made for the attachment of additional shanks and teeth if desired. Handle members 11—11 are secured as at 12 to the center beam and are provided with braces 13 which support said handles with respect to the beam. The side beams 6—6 are made adjustable for spread purposes by means of a slide 14 which is longitudinally movable upon the center beam and connected by a rod 15 to be operated by a lever 16 hingedly attached to a segment 17 on the center beam 5. This lever is provided with a spring actuated pawl 18 and trigger connection 19 for securing the lever and slide in its adjusted position. Links 20 are provided on either side for connecting the slide with side beams in a manner to adjust the same inward and outward to change the spread of the cultivator. Braces 21—21 are positioned between the handles and links 20. The respective ends of said links being hingedly connected to said handles and said links to permit the spread of the side beams.

The forward end of the center beam is curved up, around and disposed downwardly forming an arcuate member 22 and a bearing portion 23 having holes therein to support a pivotal bolt 24 and by means of which the wheel bracket 25 is pivotally connected. This wheel bracket is formed of two similarly shaped side members which when assembled, as shown in the drawings, forms a forked lower end portion 26 having aligned holes therein to receive a bolt 27. This bolt serves as a bearing or axle for the wheel 28 rotatably mounted therein. A clamping bolt 29 is positioned in aligned holes of the upper end portions of the two members forming the bracket 25 and adjacent to the outer edge of the arcuate member 22 of the forward end of the cultivator beam.

From the foregoing, it will be seen that by the loosening of the nut and bolt 29, the bracket and wheel may be adjustably swung upon its pivot 24 in a way to raise or lower the wheel and can be secured in such adjusted positions by again clamping the nut 29 which, as will be seen, is positioned close to the arcuate member and therefore adapted to securely clamp the two side portions of the bracket 25 thereto. By this means, it will be seen that the adjustment can be effected without the removal of either bolt 24 or 29 which is not possible with the commercial form of cultivator now on the market.

Having thus described my invention, what I claim and desire to secure by Letters Patent is:—

In combination, an implement beam having its forward end curved upwardly around and then downwardly to form an arcuate portion and a straight downwardly disposed end portion having a series of holes therein, a pivotal bearing carried in one of the holes in said downwardly extending end portion and concentric with said arcuate portion, a wheel bracket formed of two parts, one at each side of said forward end and pivoted in said bearing and having their upper ends terminating above said arcuate portion, a bolt passing through said upper ends in close proximity to said arcuate portion and clamping the bracket parts thereto in various adjusted positions, and a wheel carried in at the lower end of said bracket.

Signed at Leonardsville in the county of Madison and State of New York this 11th day of May, A. D., 1927.

ARTHUR W. REYNOLDS.